(12) United States Patent
Bergmann et al.

(10) Patent No.: US 6,351,583 B1
(45) Date of Patent: Feb. 26, 2002

(54) MULTIPLE LASER WAVELENGTH STABILIZATION

(75) Inventors: Ernest E. Bergmann, Lehigh County; Gail Ann Bogert, Bethlehem, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/493,931

(22) Filed: Jan. 28, 2000

(51) Int. Cl.$^7$ .............................................. G02B 6/293
(52) U.S. Cl. ........................... 385/24; 359/127; 385/37; 385/39
(58) Field of Search .............................. 385/14, 15, 24, 385/37, 39, 46, 47, 48; 359/121, 124, 127, 130

(56) References Cited

U.S. PATENT DOCUMENTS

| | | | | |
|---|---|---|---|---|
| 5,412,744 A | | 5/1995 | Dragone | 385/24 |
| 5,488,680 A | * | 1/1996 | Dragone | 385/24 |
| 5,611,007 A | * | 3/1997 | Wolf et al. | 385/14 |
| 5,636,300 A | * | 6/1997 | Keck et al. | 385/24 |
| 5,680,490 A | | 10/1997 | Cohen et al. | 385/24 |
| 5,745,275 A | | 4/1998 | Giles et al. | 359/187 |
| 5,852,505 A | | 12/1998 | Li | 359/118 |
| 6,282,344 B1 | * | 8/2001 | Bergmann et al. | 385/46 |
| 6,289,147 B1 | * | 9/2001 | Bulthuis et al. | 385/24 |

OTHER PUBLICATIONS

Li, Yuan P., et al.; "Planar Waveguide DWDMS for Telecommunications: Design Tradeoffs," NFOEC '97 Proceedings, pp. 365–374 (1997).

Li, Yuan P., et al.; "Silicon Optical Bench Waveguide Technology," *Optical Fiber Telecommunications IIIB*, pp. 319–376 (1997), Academic Press.

* cited by examiner

*Primary Examiner*—John D. Lee
(74) *Attorney, Agent, or Firm*—Duane, Morris & Heckscher LLP

(57) ABSTRACT

An optical apparatus for multiplexing a plurality of optical signals of different wavelengths to provide a multiplexed output optical signal. A plurality of input waveguides receive the plurality of optical signals. A first free space region is connected to the plurality of input waveguides, and an optical grating comprising a plurality of unequal length waveguides is connected to the first free space region. A second free space region is connected to the optical grating, and an output waveguide is connected to the second free space region for providing the multiplexed output optical signal. First and second cross-coupling output ports are connected to the second free space region for providing first and second cross-coupling output signals representative of the cross-coupling of the optical signals with said cross-coupling output signals, wherein said first and second cross-coupling signals are approximately equally strong for a given one of the optical signals only when said optical signal has a wavelength substantially equal to a specified wavelength for said optical signal.

18 Claims, 4 Drawing Sheets

MULTIPLE LASER WAVELENGTH STABILIZATION

BACKGROUND OF THE INVENTION

1. Field of the Invention

The present invention relates to optical frequency routing devices for multiplexing individual wavelength channels of a multiple laser wavelength system and, in particular, to methods and apparatuses for multiple laser wavelength channel stabilization in such a system.

2. Description of the Related Art

Optical transmission systems employing fiber optic cables are often used to transmit data by means of optical signals. Wavelength division multiplexing (WDM) is sometimes used in such systems to increase the capacity of such fiber optic transmission systems. In a WDM system, plural optical signal channels are carried over a single silica based optical fiber with each channel being assigned a particular wavelength. Dense WDM (DWDM) is also increasingly being used.

Erbium-doped optical fiber amplifiers (EDFAs) are often used to amplify light in optical transmission systems. For example, EDFAs are used to transmit amplified optical signals to the input of an optical fiber, or to amplify light received from an optical fiber. EDFAs contain a single-mode optical fiber doped with erbium. The erbium-doped fiber is "pumped" with light at a selected wavelength to provide amplification or gain at wavelengths within a low loss window of the optical fiber. The input light pump for an EDFA is typically provided by a pump laser module comprising a semiconductor laser diode (pump laser) plus an associated lens system.

A pump laser module typically comprises a pump laser such as a semiconductor laser diode fabricated in a given substrate such as InP or GaAs; an optical lens system for focusing and optically processing the beam; and a fiber for receiving the beam and outputting the beam. The pump laser typically receives an input signal in the form of an electrical current, and outputs an optical beam on the fiber. This fiber is typically fusion-spliced into a single-mode fiber of a wavelength division multiplexing (WDM) device. The fiber of the WDM device may be fusion-spliced to a single-mode erbium doped optical fiber of an optical amplifier. The WDM device combines the pump light and signal light and outputs this to the single-mode erbium doped optical fiber of the optical amplifier. The optical amplifier thus receives an optical signal at a relatively low power level, and amplifies this signal to provide an output optical signal at a higher power level.

Frequency routing devices, in particular, are often used to perform optical switching, multiplexing, and demultiplexing. These functions have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. An example of such an interconnection apparatus is disclosed in U.S. Pat. Nos. 5,002,350 and 5,136,671.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are referred to as frequency routing devices.

U.S. Pat. No. 5,412,744, "Frequency Routing Device Having a Wide and Substantially Flat Passband," issued May 2, 1995 (Dragone), the entirety of which is incorporated herein by reference, describes a technique for producing a flat passband in a frequency routing device used as a wavelength multiplexer.

Optical techniques and components, such as EDFAs and planar lightguide circuit (PLC) DWDMs make it possible to increase the data-carrying capacity of fiber optic transport systems. There is typically a fixed transmission rate per wavelength. Thus, to increase the capacity as much as possible, it is desired to increase the number of channels (wavelengths) used. This, in turn, leads to the need to decrease the channel-to-channel wavelength (or frequency) spacing. However, the decrease in frequency spacing means that the light sources (laser transmitters) employed need to be more carefully controlled so as not to drift from one wavelength channel to another.

Typically, it is desirable to have lasers with wavelength drifts much less than the channel width; larger drifts would result in increasing modulation distortion as the modulated signal approaches the edge of the system filters (which may have also drifted), and in increased interchannel leakage in the DWDM demultiplexing functions. Minimizing such channel drift may be referred to as wavelength stabilization. Fiber optics, waveguide technology, DWDM, and related matters are discussed in Yuan P. Li & Charles H. Henry, "Silicon Optical Bench Waveguide Technology," in Ivan P. Kaminow & Thomas L. Koch, eds., *Optical Fiber Telecommunications IIIB* (Academic Press, 1997): ch. 8 (pp. 319–376); Yuan P. Li & Leonard G. Cohen, "Planar Waveguide DWDMs for Telecommunications: Design Tradeoffs," NFOEC '97 Proceedings, pp. 365–374 (1997), the entireties of each of which are incorporated herein by reference.

U.S. Pat. No. 5,745,275, "Multi-Channel Stabilization of a Multi-Channel Transmitter Through Correlative Feedback," issued Apr. 28, 1998 (Giles et al.), the entirety of which is incorporated herein by reference, is directed to a method for monitoring and stabilizing the power in each optical channel. However, the Giles et al. patent does not teach a way to monitor and stabilize the wavelength, As noted above, wavelength stabilization is increasingly important for higher channel density applications. Each laser source may be separately stabilized. This approach, however, would require the use of a potentially costly or impractically large number of passive optical components. There is, therefore, a need for wavelength stabilization in optical systems employing multiple wavelengths.

SUMMARY

An optical apparatus for multiplexing a plurality of optical signals of different wavelengths to provide a multiplexed output optical signal. A plurality of input waveguides receive the plurality of optical signals. A first free space region is connected to the plurality of input waveguides, and an optical grating comprising a plurality of unequal length waveguides is connected to the first free space region. A second free space region is connected to the optical grating, and an output waveguide is connected to the second free space region for providing the multiplexed output optical signal. First and second cross-coupling output ports are connected to the second free space region for providing first and second cross-coupling output signals representative of the cross-coupling of the optical signals with said cross-coupling output signals, wherein said first and second cross-coupling signals are approximately equally strong for a given one of the optical signals only when said optical signal has a wavelength substantially equal to a specified wavelength for said optical signal.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, additional output ports are provided on the DWDM router used to multiplex the various individual wavelength channels of a multiple wavelength fiber optic transmission system. Electrical-to-optical converters and correlators are then used to determine the wavelength deviations of the individual light sources, which information is then used to control the corrections provided to the individual operating wavelengths. This permits a central or common reference to be used, which thus does not require the use of as many passive optical components as would be required if each laser light source were separately and independently stabilized.

Figure 1:
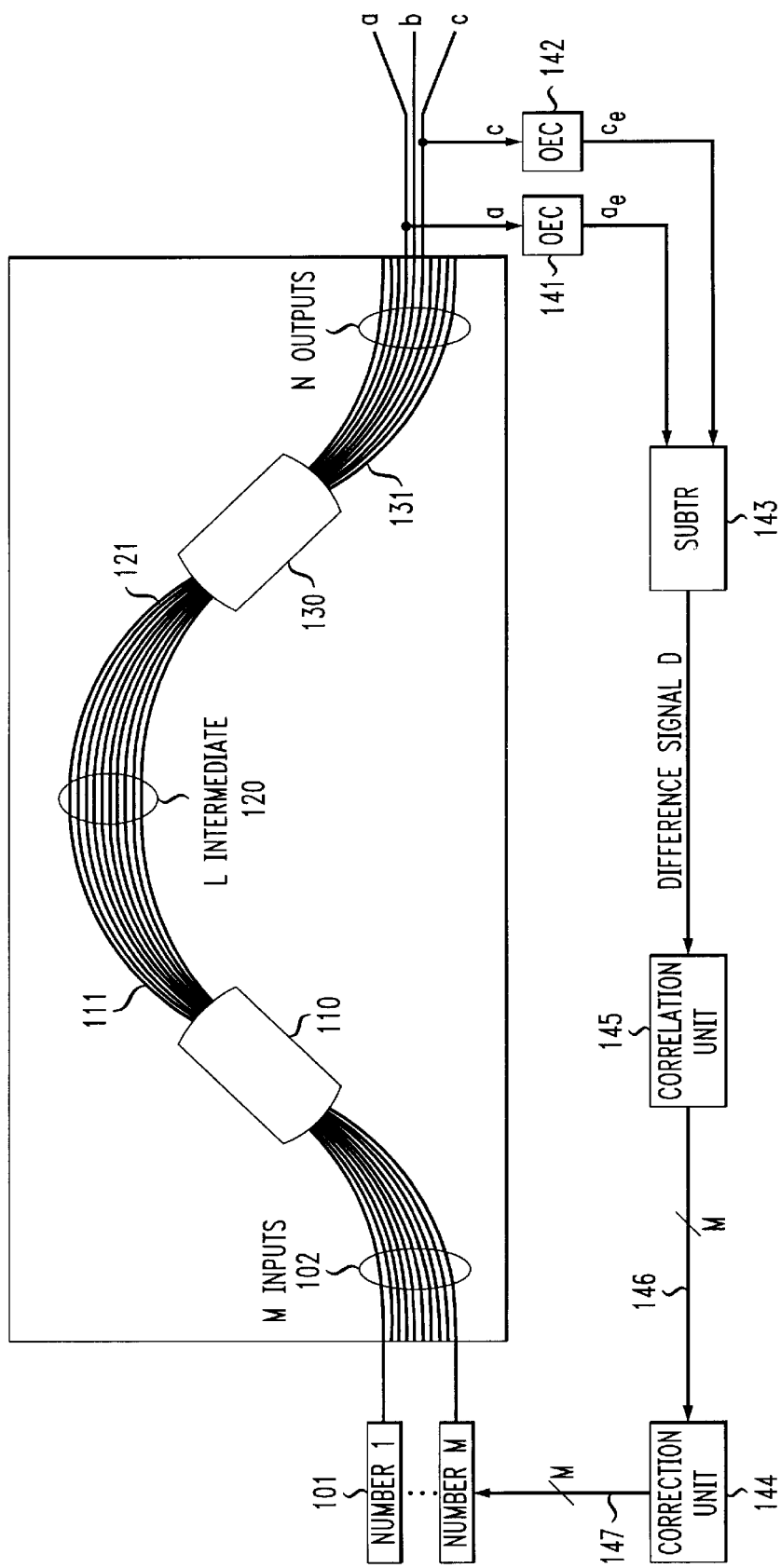
FIG. 1 is a schematic diagram of an optical frequency routing device, in accordance with an embodiment of the present invention.

Referring now to FIG. 1, there is shown a schematic diagram of an optical frequency routing device (router) 100, in accordance with an embodiment of the present invention. Routing device 100 may be part, for example, of an optical system comprising an amplifier for amplifying the output multiplexed signal produced by routing device 100, and an associated fiber cable, repeaters, and the like, for transmitting the amplified multiplexed signal to one or more remote destinations.

In routing device 100, M Laser transmitters 101 provide M respective laser driving signals (labeled 1 through M). Each laser signal is modulated independently and has a unique wavelength. The laser transmitters 101 may be implemented with an integrated distributed feedback laser (DFB) array or a multi-frequency laser (MFL) as, for example, described in M. Zimgibl, C. H. Joyner and L. W. Stulz, "Demonstration of a 9×200 Mbit/s Wavelength Division Multiplexed Transmitter", *Electron. Lett.*, Vol. 30, p. 1484 (1994), which is incorporated herein by reference, such as the multi-channel transmitter 20 of FIG. 1 of the Giles et al. patent. Thus, each optical laser signal has a unique modulation and a unique wavelength. The actual wavelength of each optical signal is ideally the same as the specified or nominal wavelength for that channel, but may be somewhat different from the specified wavelength due to drift or otherwise, such as manufacture variability.

Frequency routing device 100 also contains a plurality of input waveguides 102, one for each of the M laser transmitters 101. Input waveguides 102 are connected to a first star coupler 110, such as that described with respect to FIG. 1 of the Dragone patent. Star coupler 110 comprises, in an embodiment, a free space region. L output waveguides 111 extend from the free space region of star coupler 110 and are connected to an optical grating section 120 having L corresponding waveguides. The optical grating 120 comprises L unequal length waveguides, which provides a predetermined amount of path length difference to a corresponding plurality L of input waveguides 121 connected to a second star coupler 130. The free space region of star coupler 130 is connected to a plurality of N output waveguides 131.

In an embodiment, M =32, L=128, and N =32. Thus, star coupler 110 in this case is an M×L or 32×128 star coupler, while star coupler 130 is an L×N or 128×32 star coupler. The combination of the star couplers 110, 130, and optical grating portion 120 form a wavelength (or "Dragone") router. In a preferred embodiment, router 100 is fabricated in a single wafer.

Such frequency routing devices can operate as multiplexers and demultiplexers of optical frequencies. For example, if a signal $I_1$ of amplitude A is applied to input waveguide #1 by laser transmitter $101_1$, then signals of amplitudes $AT_{11}, AT_{12}, \ldots AT_{1N}$ are produced at the output waveguides 131, where $T_{ik}$ is the value of the transmission coefficient for input waveguide 102 and output waveguide 131. Additional details concerning the operation of such routing devices are found in the above-referenced U.S. Pat. Nos. 5,002,350 and 5,136,671.

In particular, in optical frequency routing device 100, the different wavelengths of the M signals are such that they will be multiplexed together by router 100, to provide the principal, combined or multiplexed output "b" on a selected one of the N outputs 131. There are two other outputs, labeled "a" and "c." Router 200 is constructed, as described in further detail below, so that it generally allows a small "leakage" or cross-coupling of the various transmitter inputs 101 to the outputs a and c. Thus, output signals a and c may be referred to as cross-coupling output signals. In a preferred embodiment, router 200 is constructed so that, if the transmitter wavelengths are properly aligned, the cross-coupling of each transmitter is equally strong to a and to c. Accordingly, converting the optical outputs for a and c to electrical signals will produce essentially duplicate electrical signals. Electrical versions of signals a and c will have a negligible difference when the transmitter wavelengths are substantially or acceptably aligned, However, the difference signal D obtained from electrically subtracting electrical signals obtained from a and c will not yield a negligible result when there is significant drift in one or more transmitter channel wavelengths. This difference signal may thus be analyzed and used to control the corrections provided to the individual operating wavelengths of the transmitters 101.

Although current DWDM designs most often employ uniformly spaced channel assignments, the present invention can also be used with transmitters having non-uniform channel spacings and still have equally strong cross-couplings of each transmitter to the a and to c signals, by making the lateral spacings of the M inputs 102 non-uniform in the same manner as the non-uniform channel spacings; this matching of non-uniformity would optimize the operation of the wavelength multiplexing function as well as provide for easier wavelength drift monitoring.

If one of the laser transmitters 101, e.g. laser transmitter $101_i$, drifts off of its desired wavelength, then its cross-coupling to outputs a and c will no longer be matched. Instead, this cross-coupling will generally be stronger in one of these channels and weaker in the other of these channels. The electrical difference signal will no longer vanish, but will contain a replica of the modulation applied by the drifting transmitter $101_i$. Thus, the modulation detected in the difference signal can determine which transmitter has drifted, while the strength and sign of the replica modulation of the difference signal indicates the amount and direction of drift.

If more than one of laser transmitters 101 simultaneously drifts off their individual desired wavelengths, the electrical difference signal will contain an admixture of superimposed replicas of the corresponding individual modulations. As described in the Giles patent, it is possible to electrically correlate the electrical difference signal with the original modulations and thereby determine the wavelength offsets of each of the transmitters. This information can be used to re-adjust or correct the wavelength of each transmitter. Typically, the transmitter wavelength can be adjusted by controlling its temperature and the average current supplied to the transmitter. For example, cross-coupling optical signals a and c are received by optical-to-electrical converters (OECs) 141, 142, respectively, which produce electrical cross-coupling output signals $a_e$ and $c_e$, respectively. OECs 141, 142 may comprise, for example, photodetectors. The electrical cross-coupling signals $a_e$, $c_e$, may be subtracted or compared by subtractor 143, to provide the electrical difference signal D. This may be received by correlation unit 145, which determines from the modulations and extent thereof in the difference signal the drift or wavelength offset of each transmitter. Correlation unit compares for similar fluctuations and compares each modulation (one per transmitter) to match with components in the difference signal D. Thus, correlation unit provides M individual drift correlation signals on M lines 146.

A correction unit 144 receives the M correlation signals, one for each of the M channels, and uses these correlation signals to provide the appropriate correction signals or make the appropriate changes to transmitters 101 to correct for these offsets, thereby maintaining wavelength stabilization in a multi-wavelength optical system 100. In an embodiment, correction unit 144 provides M correction signals, one for each transmitter $101_{1-N}$, via the M correction signal lines 147.

Alternatively, instead of employing a correction unit 144, the detection or ascertaining of wavelength drift in the M channels by correlation unit 145 may be used for other purposes, e.g. to set an alarm. For example, if channel 3 (i.e., the signal produced by laser transmitter $101_3$) has drifted too high in wavelength, an alarm can alert a user of this problem. The user may then take appropriate corrective action.

As will be appreciated, correction unit 144 can implement correction for each transmitter 101 in a variety of ways, based on the drift for each channel. For example, in an embodiment, correction unit 144 operates with a threshold and in a binary fashion, like a thermostat, to either turn on or turn off drift correction, when the difference signal contains a replica modulation signal, for a given transmitter, at an intensity above a predetermined threshold. Alternatively, correction unit 144 can make drift correction to a transmitter, which correction is proportionate to the degree of intensity of the replica modulation signal for that transmitter which is present in the difference signal. Correction unit 144 can make such corrections or adjustments to a transmitter by, for example, making adjustments to the temperature and/or current supplied to the transmitter.

Further, in some cases there may be errors in fabrication that produce discrepancies in the reported channel wavelength offsets, which can be measured during testing. Thus, in an alternative embodiment, a tabulation of these discrepancies is provided so that in operation the discrepancies are compensated for by the monitoring and control functions.

Figure 2:
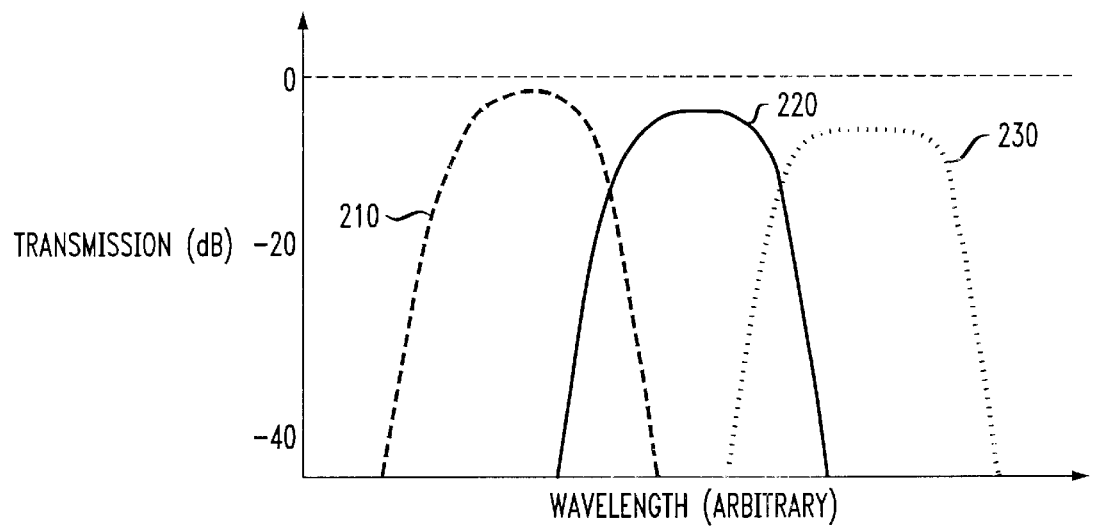
FIG. 2 is a graph illustrating tradeoffs between passband shape and insertion loss in the design of a routing device such as the routing device of FIG. 1.

The following describes the implementation details of optical router 100, in an embodiment in which the wavelength offset of each modulated light source is monitored so that it may be corrected. Referring now to FIG. 2, there is shown is a graph 200 illustrating tradeoffs between passband shape and insertion loss in the design of a routing device such as routing device 100. Further discussion of such tradeoffs may be found in the Li & Cohen reference. As will be appreciated, the distance between the top of each passband curve 210, 220, 230 and the Odb line represents the insertion loss of using such a passband. If router 100 is designed to have minimum insertion loss, for example, a Gaussian passband such as passband 210 may be used. By using such a passband, we can expect about 3 dB less coupling loss than if we strive for a flat passband, such as the flatter passband 230. In the present invention, it is assumed that the laser transmitters 101 are to be controlled to follow the center of the router filter characteristic; therefore, the lack of flatness of the passband will not result in light loss, although there may be a slight reduction in modulation bandwidth.

Figure 3:
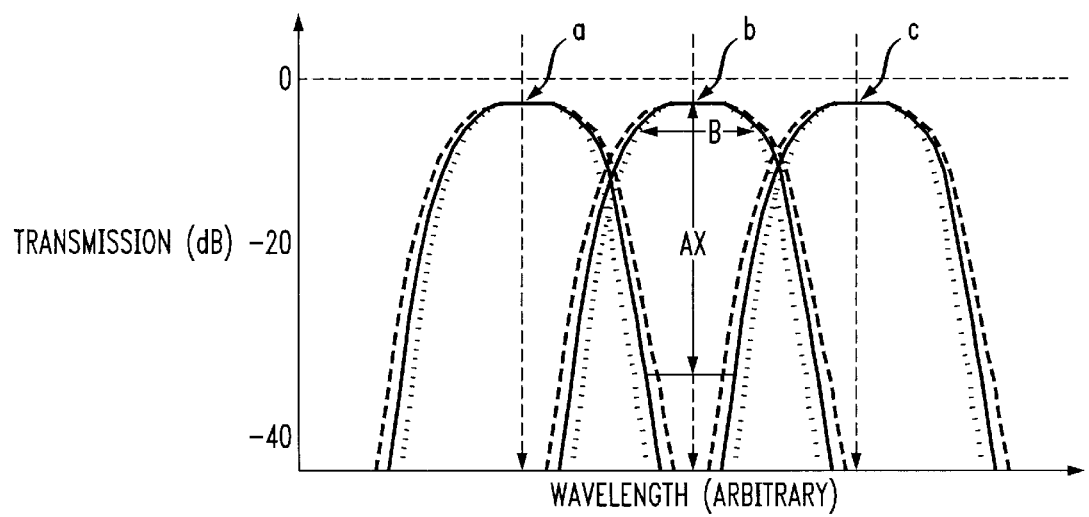
FIG. 3 is a graph containing illustrative passband curve groups for the combined output signal and the cross-coupling output signals of the routing device of FIG. 1.

Referring now to FIG. 3, there is shown is a graph 300 containing illustrative passband curve groups for the combined output signal b and the cross-coupling output signals a and c of routing device 100 of FIG. 1. Further discussion of such passband curves may be found in the Li & Cohen reference. As shown, there are three curve groups, one curve group for each of the three output signals a, b, and c, where each curve group has a solid curve, as well as a similar dashed and a dotted curve. The dashed and dotted lines represent variations in the passbands; e.g., the dashed lines indicate a slightly wider passband than shown by the solid curve.

Assume, for example, that the three solid curves for a, b, and c are representative of the coupling of any one of the input transmitters 101 as a function of wavelength coupled to output signals a, b, and c, respectively. In normal operation, where the wavelength of any given transmitter is close to its intended or design wavelength, the coupling will be primarily to the multiplexed b output channel; very little coupling will occur in the cross-coupling outputs a and c.

In conventional DWDM routers used to demultiplex (separate) the various wavelength channels, there is typically a desire to maximize the reduction in cross-coupling. However, in an embodiment, this is not as much of a concern in the multiplexing performed by optical frequency routing device 100. In the three exemplary passband widths shown in FIG. 3, the coupling to outputs a and c are so low (typically more than 40 dB weaker than the coupling to channel b) that there might not even be a strong enough signal in cross-coupling outputs a and c to observe an electrical difference signal for deviations of a transmitter by as much as 10% of the interchannel spacing. For this reason, in an embodiment, routing device 100 is configured so that there is sufficient cross-coupling between the transmitters 101 and cross-coupling signals a and c, so that the electrical difference signal will contain an observable or detectable modulation replica signal when there is significant wavelength drift for that transmitter to require attention.

Figure 4:
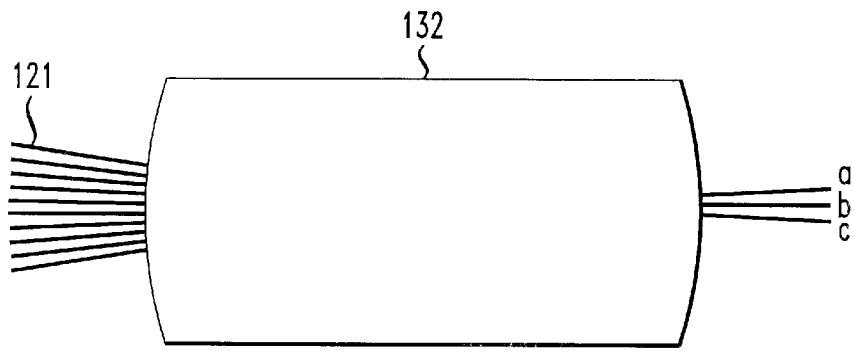
FIG. 4 shows the second star coupler of the routing device of FIG. 1 in further detail.

Referring now to FIG. 4, there is shown second star coupler 130 of routing device 100 of FIG. 1 in further detail. The region between the L inputs 121 to this star coupler 130 and the three outputs a, b, and c may be referred to as the free space region 132 of the star coupler. Region 132 does not confine the light in the same manner that the waveguides do. Like the waveguides, the light injected thereto is largely confined to a limited range of distances from the planar surface of the device; this confinement is achieved by raising the index of refraction at this range of distances from the substrate surface in a manner like for the waveguides. Unlike the waveguides, however, this raised index is spread laterally parallel to the major device surfaces, so that the light is allowed to diverge or spread laterally as it leaves the input waveguides. For these reasons, such a region is referred to as a "free space" region. There is an analogous free space region for the first star coupler 110 of FIG. 1, as well.

Since the electrical difference signal D is proportional to the difference in the optical power coupled into the outputs a and c, it may be preferable, in an embodiment, that the crossing of the response curves for a and for c in FIG. 3 be at a higher coupling point. That is, it may be desired to move the passbands for cross-coupling signals a and c closer toward the central wavelength of combined output signal b, and thus closer toward each other. The passband width may be widened even more than suggested by the dashed curve lines of FIG. 3, by "defocusing" of the router design. Defocusing is achieved by having one or both of the free space regions 110, 130 changed in length. Defocusing will cause the responses of the three outputs shown in FIG. 3 to spread further into and across each other. However, such defocusing, while possibly desirable to causing the crossing to be at a higher coupling point, also reduces the maximum coupling into the output port b.

Figure 5:
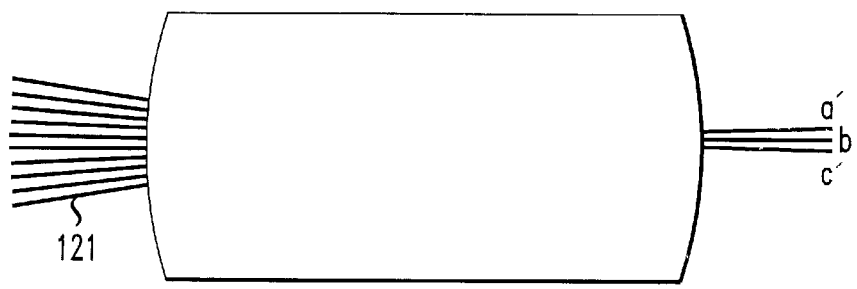
FIG. 5 shows an alternative embodiment of the second star coupler of the routing device of FIG. 1, having reduced spacing between the three output guides to bring the coupling into the cross-coupling output signals closer in wavelength range(s) to that of the combined output signal.

In another embodiment, the passbands for cross-coupling signals a and c are moved closer toward the central wavelength of combined output signal by reducing the spacing between the three output guides, as shown in FIG. 5. In this embodiment, cross-coupling output guides a' and c' are closer in spacing to combined output guide b, than are guides a and c of FIG. 4. The reduction in spacing between a' and b and between b and c' is limited, however, by the finite width of the three guides at the end of the free space region and by the need to have the guides spaced far enough apart to avoid excessive evanescent coupling between neighboring guides.

Figure 6:
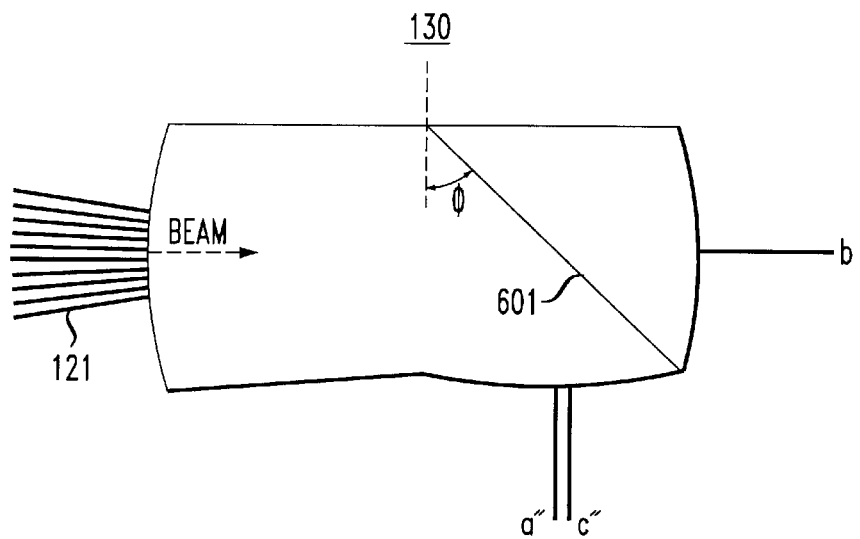
FIG. 6 shows an alternative embodiment of the second star coupler of the routing device of FIG. 1, having a beam splitter to tap off light in the free space region to provide the cross-coupling signals.

In yet another embodiment, a beam splitter 601 is employed to tap off some of the light in the free space region of the second star coupler 130, from which cross-coupling signals a" and c" can be taken, as shown in FIG. 6. In this embodiment, output port b is at one side of the star coupler 130, and cross-coupling signal ports for signals a"and c" are on another side, preferably a side adjacent and substantially orthogonal to the output port side. Beam splitter 601 taps off a portion of light in the free space region and directs it to the cross-coupling signal port side, so that the cross-coupling signal ports can provide the cross-coupling signals a", c".

In an embodiment, beam splitter 601 is fabricated by lithographic means, along with the other features of routing device 100. By increasing or decreasing the dopant level in a narrow, line-like region indicated by the line representing beam splitter 601, some of the light will be reflected instead of transmitted through the beam splitting region. The amount of reflection for a given amount of modulation can be increased by forming a series of closely spaced lines to form a diffraction grating. By limiting the width of the grating of beam splitter 601 to a few wavelengths, the bandwidth of the beam splitter's reflection will still remain adequate. Preferably, beam splitter 601 is employed to tap off at most a few percent of the incident light so that most of the light can still be collected at output b.

In an embodiment, beam splitter 601 is not necessarily oriented at an angle $\phi=45°$ (with respect to a line normal to the light beam crossing the free space region from left (where inputs 121 interface) to right (where output guide b interfaces), but is closer to normal to the beam so that more of the reflection is back toward the incident direction (toward the input ports 121). This is because the polarization dependence of the reflection will be less pronounced in such a case. In some applications, the polarization of the input light is controlled and then the polarization dependence of the beam splitter may be used to advantage instead.

In any event, in using beam splitter 601, two supplemental cross-coupling outputs a" and c" may be used, which may be closer together than is possible in the arrangement of FIGS. 4, 5, where output b is between the cross-coupling outputs. The corresponding partial overlap of the coupling responses to a" b, and c", analogous to that of a, b, and c of FIG. 3, will show more overlap. However, with more overlap, the "height" of a" and c" will generally be lower (less maximum coupling) than that of output b because of the weakness of the tap ratio supplied by the beam-splitter.

Figure 7:
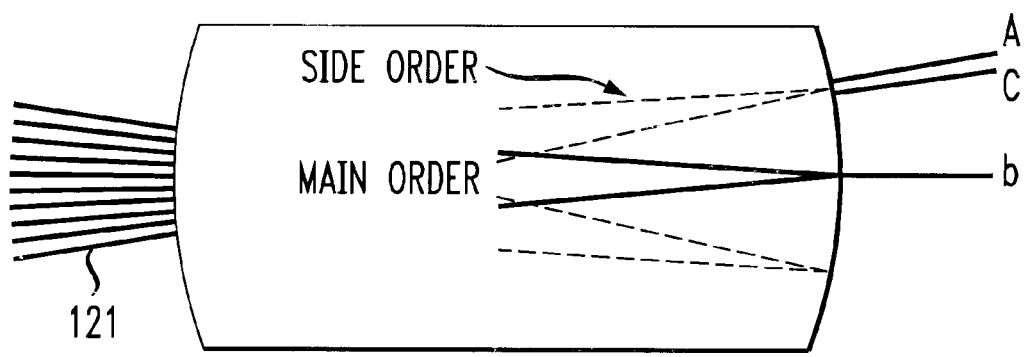
FIG. 7 shows an alternative embodiment of the second star coupler of the routing device of FIG. 1, employing lateral diffraction to separate the first side order signals from the main order signal to provide the cross-coupling signals.
Figure 8:
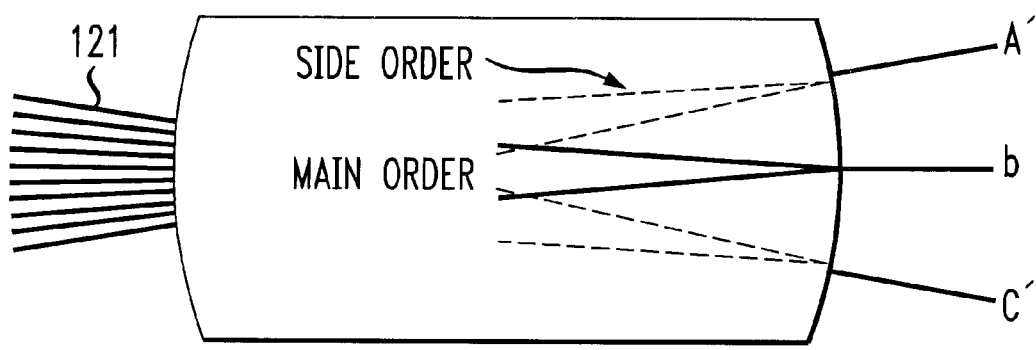
FIG. 8 shows an alternative embodiment of the second star coupler of FIG. 7, in which the cross-coupling outputs are separated and symmetrical to avoid wavelength-dependency in the cross-coupling signals.

Alternatively, it is possible to achieve a similarly high degree of partial overlap of the coupling responses, as obtained from using the star coupler 130 of FIG. 6, by using lateral diffraction instead of reflection from a beam splitter. By the nature of the transfer of light by a series of waveguides from the first to the second star coupler, there will be "side orders" caused by diffraction, in addition to the original "main order." Alternative embodiments of star coupler 130 employing such side order signals to provide the cross-coupling output signals are shown in FIGS. 7 and 8, in which the first side orders are shown above and below the main order. The main order is indicated by a pair of converging solid lines and each of the side orders are indicated by a pair of converging dashed lines.

Referring now to FIG. 7, combined output b is provided at the centrally located waveguide as before, to receive the main order signals. However, the cross-coupling waveguides or output ports A and C are provided near each other and above the output port for output b, as shown. It is expected that if the wavelength of the light source is changing, the location of the "waists" (i.e., where the image of the order is smallest) will move up and down and vary in coupling to the output ports A, b, and C. When the coupled power is measured to be equal in A and C, the waists should be midway between the centers of these two output ports. By appropriately designing router 100 and star coupler 130, based upon the operating wavelengths and the spacing of the input waveguides 121 to the second star coupler 130, positioning the side order signal so that it falls precisely midway between the waveguide ports for outputs A and C is equivalent to centering the main order on output coupler b.

It should be noted, however, that this design will be slightly wavelength-dependent, as is typical for diffractive designs. The spacing between the side order and the main order will be approximately proportional to wavelength. Thus, for example, if a range of wavelengths, say 1550 and 1565.5 nm, which differ by 1%, were to be used, the spacing between these orders will change by about 1%, and it will not be possible to center both of these wavelengths automatically and precisely on output b.

The embodiment of second star coupler 130 shown in FIG. 8 avoids the wavelength-dependent error encountered in using the embodiment shown in FIG. 7. In star coupler 130 as shown in FIG. 8, both side orders are used to provide the cross-coupling output signals A', C', where one side order signal is somewhat off of the waveguide for output A', and the other side order signal is somewhat off of the waveguide for output C'. Thus, in this embodiment, when the coupled power to outputs A' and C' are equalized, the offsets of the corresponding side orders from the outputs A' and C' are equalized. By construction, we have the spacing of A' to b and b to C' matched; the symmetry of the construction and control will center the main order on output b. Additional benefits of the embodiment shown in FIG. 8 are that one can choose the amount of overlap of response (see FIG. 3, e.g.) without concern that the three waveguides will mechanically be too close. However, because of the wavelength dependence of diffraction, there will be a slight variation of response overlap with wavelength, as with the embodiment of FIG. 7.

The effective numerical aperture of the individual input waveguides 121 will determine the relative peak coupling strengths for each of the output waveguides. For example, as noted previously, it may be desired to couple as little light as necessary into the side orders to avoid reduction of coupling into the main order, so that the effective numerical aperture is not larger than necessary.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An optical apparatus for multiplexing a plurality of optical signals of different wavelengths to provide a multiplexed output optical signal, the apparatus comprising:

a plurality of input waveguides for receiving the plurality of optical signals;

a first free space region connected to the plurality of input waveguides;

an optical grating connected to the first free space region and comprising a plurality of unequal length waveguides;

a second free space region connected to the optical grating;

an output waveguide connected to the second free space region for providing the multiplexed output optical signal; and first and second cross-coupling output ports connected to the second free space region for providing first and second cross-coupling output signals representative of the cross-coupling of the optical signals with said cross-coupling output signals, wherein said first and second cross-coupling signals are approximately equally strong for a given one of the optical signals only when said optical signal has a wavelength substantially equal to a specified wavelength for said optical signal.

2. The optical apparatus of claim 1, wherein:

the output waveguide is connected to the second free space region at a first side of the second free space region;

the first and second cross-coupling output ports are connected to the second free space region at a second side of the second free space region adjacent and substantially orthogonal to the first side; and said second free space region comprises a beam splitter for tapping off a portion of the light in the free space region to direct the portion of light to the second side of the second free space region so as to permit the first and second cross-coupling ports to provide said first and second cross-coupling signals without being on the first side of the second free space region along with the output waveguide.

3. The optical apparatus of claim 2, wherein the beam splitter comprises a line-like region comprising a series of closely spaced lines to form a diffraction grating, wherein the closely spaced lines are formed by one of increasing or decreasing the relative dopant level in the regions of the closely spaced lines.

4. The optical apparatus of claim 1, wherein, when one of the optical signals has drifted in wavelength from the specified wavelength for said optical signal, a difference signal generated by taking a difference between said first and second cross-coupling signals contains a replica of a modulation applied to said optical signal, wherein the strength and sign of said replica of said modulation signal indicates the amount and direction of said drift.

5. The optical apparatus of claim 4, further comprising:

first and second optical-to-electrical converters for converting said first and second cross-coupling output signals into first and second electrical cross-coupling signals, respectively; and a comparator for subtracting said first and second electrical cross-coupling signals to provide said difference signal.

6. The optical apparatus of claim 5, further comprising:

a plurality of laser transmitters for producing said plurality of optical signals and for applying respective modulations to said optical signals; and a correlation unit for receiving said difference signal and for detecting drifts of said laser transmitters in accordance with said difference signal.

7. The optical apparatus of claim 6, further comprising a correction unit for adjusting the wavelengths of said laser transmitters to correct for drift in accordance with said detection of said drifts by said correlation unit.

8. The optical apparatus of claim 1, wherein:
the output waveguide is connected to the second free space region at a first side of the second free space region to receive a main order of the light in the second free space region;
the first and second cross-coupling output ports are connected to the second free space region at the first side of the second free space region, wherein the first and second cross-coupling output ports are positioned around and equally distant from the waist of a side order of the light in the second free space region signal so that the side order falls precisely midway between the first and second cross-coupling ports, for a given one of the optical signals when said optical signal has a wavelength substantially equal to a specified wavelength for said optical signal.

9. The optical apparatus of claim 1, wherein:
the output waveguide is connected to the second free space region at a first side of the second free space region to receive a main order of the light in the second free space region;
the first cross-coupling output port is connected to the second free space region at the first side of the second free space region close to the position of a waist of a first side order of the light in the second free space region signal, for a given one of the optical signals, when said optical signal has a wavelength substantially equal to a specified wavelength for said optical signal; and
the second cross-coupling output port is connected to the second free space region at the first side of the second free space region close to the position of a waist of a second side order of the light in the second free space region signal, for a given one of the optical signals, when said optical signal has a wavelength substantially equal to a specified wavelength for said optical signal.

10. The optical apparatus of claim 1, wherein:
the plurality of optical signals comprises exactly M optical signals;
the plurality of input waveguides comprises exactly M input waveguides;
the optical grating comprises exactly L unequal length waveguides;
the output waveguide is one of N output waveguides of the second free space region;
the first free space region is implemented by an M×L star coupler; and
the second free space region is implemented by an L×N star coupler.

11. The optical apparatus of claim 10, wherein M=32, L=128, and N=32.

12. In an optical apparatus for multiplexing a plurality of optical signals of different wavelengths and modulations to provide a multiplexed output optical signal, the optical apparatus comprising a plurality of input waveguides for receiving the plurality of optical signals; a first free space region connected to the plurality of input waveguides; an optical grating connected to the first free space region and comprising a plurality of unequal length waveguides; a second free space region connected to the optical grating; and an output waveguide connected to the second free space region for providing the multiplexed output optical signal, a method for ascertaining wavelength drift in the optical signals, comprising the steps of:

providing first and second cross-coupling signals at first and second cross-coupling output ports connected to the second free space region, wherein said first and second cross-coupling signals are representative of the cross-coupling of each of the optical signals with said cross-coupling output signals, wherein said first and second cross-coupling signals are approximately equally strong for a given one of the optical signals only when said optical signal has a wavelength substantially equal to a specified wavelength for said optical signal, further wherein, when one of the optical signals has drifted in wavelength from the specified wavelength for said optical signal, a difference signal generated by taking a difference between said first and second cross-coupling signals contains a replica of a modulation applied to said optical signal, wherein the strength and sign of said replica of said modulation signal indicates the amount and direction of said drift;

converting, with first and second optical-to-electrical converters, said first and second cross-coupling output signals into first and second electrical cross-coupling signals, respectively; and subtracting, with a comparator, said first and second electrical cross-coupling signals to provide said difference signal.

13. The method of claim 12, wherein:
the output waveguide is connected to the second free space region at a first side of the second free space region; and
the first and second cross-coupling output ports are connected to the second free space region at a second side of the second free space region adjacent and substantially orthogonal to the first side; the method further comprising the step of tapping off a portion of the light in the free space region, with a beam splitter, to direct the portion of light to the second side of the second free space region so as to permit the first and second cross-coupling ports to provide said first and second cross-coupling signals without being on the first side of the second free space region.

14. The method of claim 12, further comprising the steps of:
producing said plurality of optical signals and applying respective modulations to said optical signals, with a respective plurality of laser transmitters; and
receiving said difference signal and detecting drifts of said laser transmitters in accordance with said difference signal.

15. The method of claim 14, further comprising the step of adjusting the wavelengths of said laser transmitters to correct for drift in accordance with said detection of said drifts.

16. The method of claim 12, wherein:
the plurality of optical signals comprises exactly M optical signals;
the plurality of input waveguides comprises exactly M input waveguides;
the optical grating comprises exactly L unequal length waveguides;
the output waveguide is one of N output waveguides of the second free space region;
the first free space region is implemented by an M×L star coupler; and
the second free space region is implemented by an L×N star coupler.

17. The method of claim 16, wherein M=32, L=128, and N=32.

18. A system comprising an optical apparatus for multiplexing a plurality of optical signals of different wavelengths to provide a multiplexed output optical signal, the optical apparatus comprising:

a plurality of input waveguides for receiving the plurality of optical signals;

a first free space region connected to the plurality of input waveguides;

an optical grating connected to the first free space region and comprising a plurality of unequal length waveguides;

a second free space region connected to the optical grating;

an output waveguide connected to the second free space region for providing the multiplexed output optical signal; and first and second cross-coupling output ports for providing first and second cross-coupling output signals representative of the cross-coupling of the optical signals with said cross-coupling output signals, wherein said first and second cross-coupling signals are approximately equally strong for a given one of the optical signals only when said optical signal has a wavelength substantially equal to a specified wavelength for said optical signal.

* * * * *